(12) United States Patent
Garavuso et al.

(10) Patent No.: US 11,611,450 B2
(45) Date of Patent: Mar. 21, 2023

(54) USER SCENE AND SCHEDULE CREATION BASED ON TIME OF THE YEAR

(71) Applicant: The ADT Security Corporation, Boca Raton, FL (US)

(72) Inventors: Michael Garavuso, Boynton Beach, FL (US); Gary E. Friar, Saint Cloud, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/392,017

(22) Filed: Aug. 2, 2021

(65) Prior Publication Data

US 2021/0367805 A1  Nov. 25, 2021

Related U.S. Application Data

(63) Continuation of application No. 16/059,859, filed on Aug. 9, 2018, now Pat. No. 11,108,584.
(Continued)

(51) Int. Cl.
| | |
|---|---|
| *H04L 12/28* | (2006.01) |
| *H04L 29/08* | (2006.01) |
| *G05B 19/04* | (2006.01) |
| *H04W 4/33* | (2018.01) |
| *H04W 4/70* | (2018.01) |
| *G06Q 10/06* | (2023.01) |
| *G05B 15/02* | (2006.01) |

(Continued)

(52) U.S. Cl.
CPC .......... *H04L 12/2816* (2013.01); *G05B 15/02* (2013.01); *G05B 19/04* (2013.01); *G06Q 10/06* (2013.01); *H04L 67/125* (2013.01); *H04L 67/52* (2022.05); *H04W 4/33* (2018.02); *H04W 4/70* (2018.02); *G05B 2219/2642* (2013.01); *H04L 2012/285* (2013.01)

(58) Field of Classification Search
CPC ... H04L 12/2816; H04L 67/125; H04L 67/52; H04L 2012/285; G05B 15/02; G05B 19/04; G05B 2219/2642; G06Q 10/06; H04W 4/33; H04W 4/70
See application file for complete search history.

(56) References Cited

U.S. PATENT DOCUMENTS

| | | |
|---|---|---|
| 6,473,661 B1 | 10/2002 | Wollner |
| 8,185,245 B2 | 5/2012 | Amundson et al. |

(Continued)

*Primary Examiner* — Charles R Kasenge
(74) *Attorney, Agent, or Firm* — Christopher & Weisberg, P.A.

(57) ABSTRACT

A controller and method for a premises system are provided. The controller includes processing circuitry configured to: receive a plurality of system setting groups for controlling a plurality of premises devices where each system setting group including at least one respective device setting for each of the plurality of premises devices, determine at least one setting characteristic, the at least one setting characteristic including a calendar date, and select one of the plurality of system settings groups for controlling the plurality of premises devices based on the determined at least one setting characteristic. The controller includes a transceiver configured to transmit a control signal to each of the plurality of premises devices to control the plurality of premises devices according to the selected one of the plurality of system setting groups.

18 Claims, 5 Drawing Sheets

Related U.S. Application Data (60) Provisional application No. 62/543,628, filed on Aug. 10, 2017.

(51) Int. Cl.
*H04L 67/125* (2022.01)
*H04L 67/52* (2022.01)

(56) References Cited

U.S. PATENT DOCUMENTS

| | | |
|---|---|---|
| 8,326,466 B2 | 12/2012 | Peterson |
| 8,538,586 B2 | 9/2013 | Amundson et al. |
| 9,851,728 B2 | 12/2017 | Matsuoka et al. |
| 9,890,970 B2 | 2/2018 | Bruck et al. |
| 9,910,449 B2 | 3/2018 | Matsuoka et al. |
| 9,998,475 B2 | 6/2018 | Ruffner et al. |
| 10,274,382 B1 * | 4/2019 | Trundle ............... G01K 13/00 |
| 10,356,303 B1 | 7/2019 | Jordan, II et al. |
| 11,532,939 B1 * | 12/2022 | Roberts ............... H02J 7/35 |
| 2009/0132091 A1 | 5/2009 | Chambers et al. |
| 2009/0133051 A1 | 5/2009 | Hildreth |
| 2009/0240381 A1 | 9/2009 | Lane |
| 2011/0184562 A1 | 7/2011 | Amundson et al. |
| 2011/0184564 A1 | 7/2011 | Amundson et al. |
| 2011/0184565 A1 | 7/2011 | Peterson |
| 2012/0318475 A1 | 12/2012 | Glover |
| 2013/0158721 A1 | 6/2013 | Somasundaram et al. |
| 2014/0277769 A1 | 9/2014 | Matsuoka et al. |
| 2014/0277795 A1 | 9/2014 | Matsuoka et al. |
| 2014/0316584 A1 | 10/2014 | Matsuoka et al. |
| 2015/0072674 A1 * | 3/2015 | Shoemaker ............ H05B 47/105 455/420 |
| 2015/0204561 A1 | 7/2015 | Sadwick et al. |
| 2016/0195289 A1 | 7/2016 | Matsuoka et al. |
| 2016/0327921 A1 | 11/2016 | Ribbich et al. |
| 2016/0335865 A1 | 11/2016 | Sayavong et al. |
| 2016/0373453 A1 | 12/2016 | Ruffner et al. |
| 2017/0018158 A1 | 1/2017 | Sayavong et al. |
| 2017/0018159 A1 | 1/2017 | Sayavong et al. |
| 2017/0018170 A1 | 1/2017 | Sayavong et al. |
| 2017/0234562 A1 | 8/2017 | Ribbich et al. |
| 2017/0238401 A1 | 8/2017 | Sadwick et al. |
| 2017/0338974 A1 | 11/2017 | Shoemaker et al. |
| 2018/0010818 A1 | 1/2018 | Maruyama et al. |
| 2018/0144615 A1 * | 5/2018 | Kinney ............... G07C 9/00 |
| 2018/0323996 A1 * | 11/2018 | Roman ............... H04L 12/282 |

* cited by examiner

USER SCENE AND SCHEDULE CREATION BASED ON TIME OF THE YEAR

CROSS-REFERENCE TO RELATED APPLICATIONS

This application is a continuation of and claims priority to U.S. Utility patent application Ser. No. 16/059,859, filed on Aug. 9, 2018, entitled USER SCENE AND SCHEDULE CREATION BASED ON TIME OF THE YEAR, which claims priority to U.S. Provisional Patent Application Ser. No. 62/543,628, filed Aug. 10, 2017, entitled USER SCENE AND SCHEDULE CREATION BASED ON TIME OF THE YEAR, the entirety of which is incorporated herein by reference.

TECHNICAL FIELD

This disclosure relates to a method, system and controller for premises based systems, and in particular to controlling premises devices in a premises based system.

BACKGROUND

Popularity of premises systems continues to grow at a rapid pace. These premises systems provide security and/or home automation services to a premises such as a home or building. In these existing systems, heating, ventilation and air conditioning (HVAC) systems within the premises can be controlled by the premises system. For example, an end user can input a predefined "scene" or daily schedule for controlling the HVAC system in which a controller of the premises system will operate the HVAC system according to the user defined schedule. Manual modification of a daily operating schedule is required if a user wants to change operating parameters. For example, turning on the air conditioning in the summer months and the heat in the winter months requires the user to manually modify the daily schedule.

SUMMARY

Some embodiments advantageously provide a method and controller for controlling premises devices in a premises based system.

According to one aspect of the invention, a controller for a premises system is provided. The controller includes processing circuitry configured to: receive a plurality of system setting groups for controlling a plurality of premises devices where each system setting group including at least one respective device setting for each of the plurality of premises devices, determine at least one setting characteristic, the at least one setting characteristic including a calendar date, and select one of the plurality of system settings groups for controlling the plurality of premises devices based on the determined at least one setting characteristic. The controller includes a transceiver configured to transmit a control signal to each of the plurality of premises devices to control the plurality of premises devices according to the selected one of the plurality of system setting groups.

According to one embodiment of this aspect, the determined at least one setting characteristic includes a geographical location of the controller, the selected one of the plurality of system setting groups being based on the determined geographical location of the controller. According to one embodiment of this aspect, a first system settings group of the plurality of system setting groups for controlling the plurality of premises devices includes a first monthly temperature setting for at least one the plurality of premises devices, and a second system settings group of the plurality of system settings groups for controlling the plurality of premises devices includes a second monthly temperature setting for at least one of the plurality of premises devices where the second monthly temperature setting being different from the first monthly temperature setting.

According to one embodiment of this aspect, each of the plurality of system setting groups correspond to a respective seasonal setting. According to one embodiment of this aspect, the determined at least one setting characteristic includes a geographical location of the controller, a weather forecast associated with the determined geographical location and the calendar date during which a season is to begin, and the selected one of the plurality of system setting groups being based on the determined geographical location of the controller, the weather forecast associated with the determined geographical location and the calendar date during which the season is to begin.

According to one embodiment of this aspect, the selected one of the plurality of system setting groups includes at least one device setting for a heating and air condition (HVAC) system and at least one device setting for ceiling fan at the premises. According to one embodiment of this aspect, the selected one of the plurality of system setting groups includes at least one device setting for a heating and air condition (HVAC) system and at least one device setting for at least one home automation device. According to one embodiment of this aspect, the selected one of the plurality of system setting groups includes at least one device setting for an appliance at the premises and at least one device setting for at least one light fixture at the premises. According to one embodiment of this aspect, the processing circuitry is further configured to receive weather forecast data, the selected one of the plurality of system setting groups being based on the received weather forecast data.

A method for a controller for a premises system is provided. A plurality of system setting groups for controlling a plurality of premises devices are received. Each system setting group including at least one respective device setting for each of the plurality of premises devices. At least one setting characteristic is determined where the at least one setting characteristic including a calendar date. One of the plurality of system settings groups for controlling the plurality of premises devices is selected based on the determined at least one setting characteristic. A control signal is transmitted to each of the plurality of premises devices to control the plurality of premises devices according to the selected one of the plurality of system setting groups.

According to one embodiment of this aspect, the determined at least one setting characteristic includes a geographical location of the controller, the selected one of the plurality of system setting groups being based on the determined geographical location of the controller. According to one embodiment of this aspect, a first system settings group of the plurality of system setting groups for controlling the plurality of premises devices includes a first monthly temperature setting for at least one the plurality of premises devices, and a second system settings group of the plurality of system settings groups for controlling the plurality of premises devices includes a second monthly temperature setting for at least one of the plurality of premises devices, the second monthly temperature setting being different from the first monthly temperature setting.

According to one embodiment of this aspect, each of the plurality of system setting groups correspond to a respective seasonal setting. According to one embodiment of this aspect, the determined at least one setting characteristic includes a geographical location of the controller, a weather forecast associated with the determined geographical location and the calendar date during which a season is to begin. The selected one of the plurality of system setting groups is based on the determined geographical location of the controller, the weather forecast associated with the determined geographical location and the calendar date during which the season is to begin.

According to one embodiment of this aspect, the selected one of the plurality of system setting groups includes at least one device setting for a heating and air condition (HVAC) system and at least one device setting for ceiling fan at the premises. According to one embodiment of this aspect, the selected one of the plurality of system setting groups includes at least one device setting for a heating and air condition (HVAC) system and at least one device setting for at least one home automation device. According to one embodiment of this aspect, the selected one of the plurality of system setting groups includes at least one device setting for an appliance at the premises and at least one device setting for at least one light fixture at the premises. According to one embodiment of this aspect, weather forecast data is received where the selected one of the plurality of system setting groups being based on the received weather forecast data.

According to another aspect of the invention, a controller for a premises system is provided. The controller includes processing circuitry configured to: receive a plurality of system setting groups for controlling a plurality of different types of premises devices where each system setting group corresponding to a respective seasonal setting and including at least one respective device setting for each of the plurality of different types of premises devices, determine at least one setting characteristic where the at least one setting characteristic including a calendar date and geographical location of the controller, and select one of the plurality of system settings groups for controlling the plurality of different types of premises devices based on the determined at least one setting characteristic. The controller includes a transceiver configured to transmit a control signal to each of the plurality of different types of premises devices to control the plurality of different types of premises devices according to the selected one of the plurality of system setting groups.

According to one embodiment of this aspect, the processing circuitry is further configured to receive weather forecast data, the selected one of the plurality of system setting groups being based on the received weather forecast data.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

The invention solves the problems with existing systems by configuring the premises system to select among various predefined settings, e.g., HVAC settings, access control settings or other system/device settings, based on one or more factors such as location of the premises system and seasonal weather.

Before describing in detail example embodiments that are in accordance with the disclosure, it is noted that the embodiments reside primarily in combinations of controller components and processing steps related to controlling premises devices in a premises based system. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication. For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Figure 1:
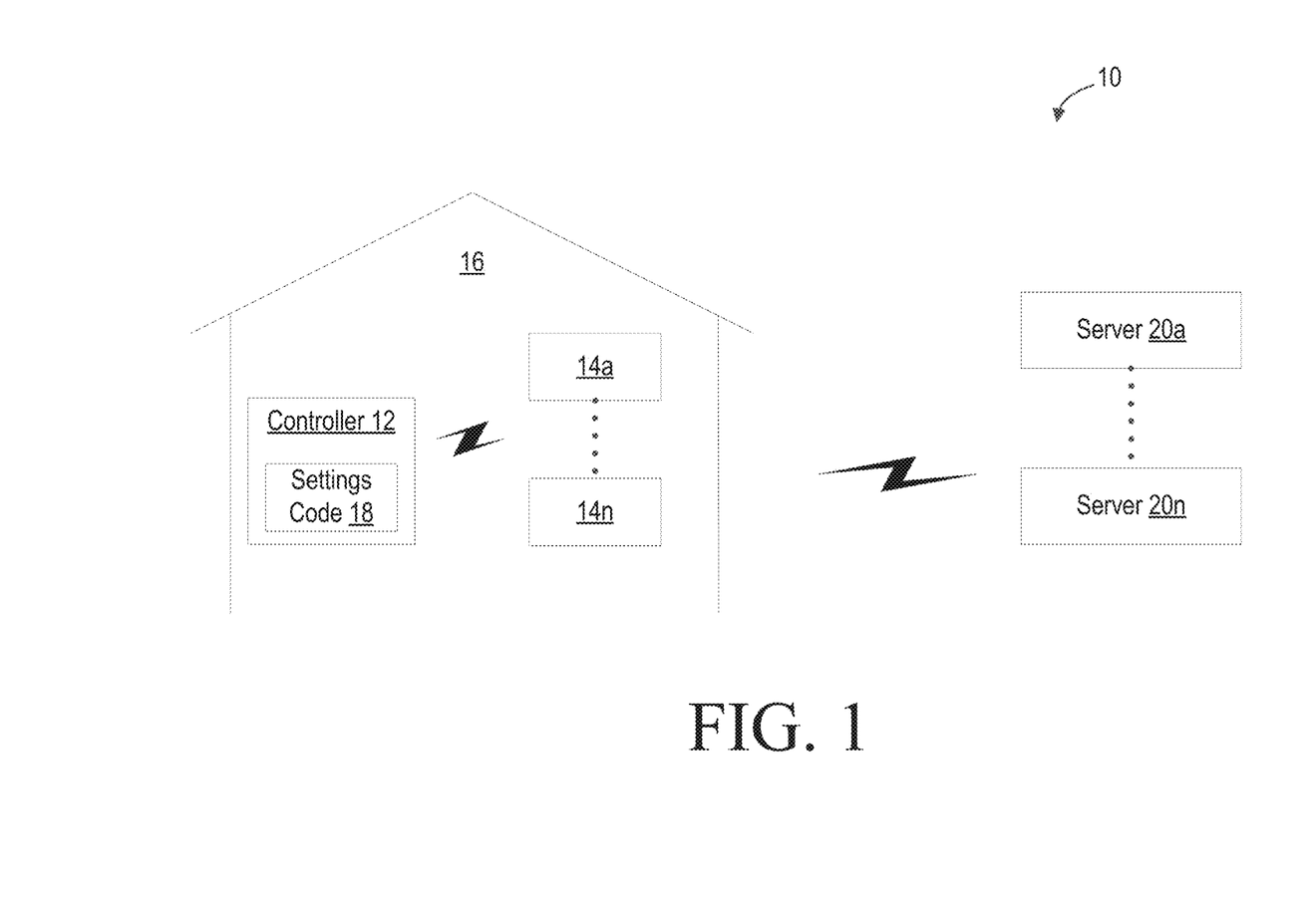
FIG. 1 is a block diagram of an example system for controlling premises devices in a premises based system in accordance with the principles of the invention.

Referring now to drawing figures in which like reference designators refer to like elements there is shown in FIG. 1 is an example system for controlling premises devices in a premises based system in accordance with the principles of the invention and designated generally as "10." System 10 includes controller 12 in communication with one or more premises devices 14a-14n (collectively referred to herein as premises devices 14), which are located or positioned within and/or outside of premises 16. Controller 12 includes settings code 18 for performing the setting process described in detail with respect to FIG. 3. In one or more embodiments, controller 12 is configured to communicate and/or control one or more premises devices 14 via one or more networks using one or more communication protocols known in the art such as Ethernet, X10, Z-wave, Zigbee, BLUETOOTH and the like, and communicate with servers 20a-20n (collectively referred to herein as servers 20) via one or more networks using one or more communication protocols as may be known in the art such as TCP/IP, Wi-Fi, cellular technologies (e.g., 4G, LTE, 5G, etc.) and the like.

Premises devices 14 may be configured to monitor doors, driveway gates, windows, and other openings, or to control lights, appliances, HVAC systems (e.g., temperature, cooling, heating, exhaust fans, etc.), access control, door locks, lawn sprinklers, etc. For example, one or more premises devices 14 may be used to sense motion and other alarm conditions, such as glass breaking, fire, smoke, temperature, chemical compositions, water, carbon monoxide, or other hazardous conditions. Premises device 14 may include video cameras that may be used to detect motion and/or capture video of events, and or other sensor that are not particularly limited and may also include any number of health, safety, and lifestyle devices—various medical condition monitors and personal emergency response systems, thermostats, appliance modules, key fobs, keypads, and touch screens, a gateway router, etc. Premises 16 is not limited to a home and may also be used within a boat, office suite, industrial building, or any other indoor or outdoor area where control of premises devices 14 is desired. It should be understood that not all of such premises devices 14 may be installed within a given system. Premises device 14 may use a variety of wireless communication protocols. For example, premises device 14 may be, may be part of or may include a home automation device, and may use wireless and/or wired protocols developed for home automation, like X10, Z-wave and ZigBee, while others use more general wireless protocols such as Wi-Fi and BLUETOOTH.

In one or more embodiments, server 20 may include or be part of at least one of a central monitoring station server, weather server, government server and other server that transmits data or information to controller 12 as described herein.

Figure 2:
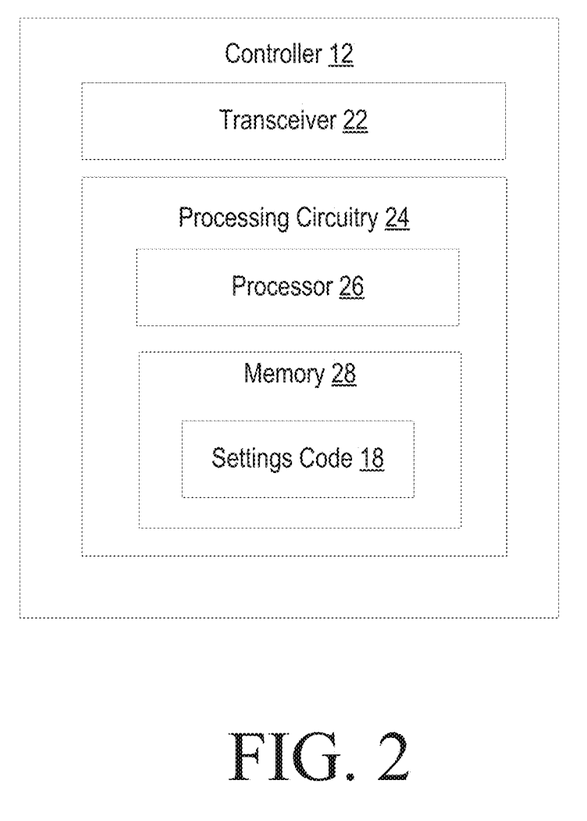
FIG. 2 is a block diagram of an example controller for communicating with and/or controlling a premises device in accordance with the principles of the invention.

FIG. 2 is a block diagram of an exemplary controller 12 for communicating with and/or controlling premises devices 14 in accordance with the principles of the invention. Controller 12 includes one or more transceivers 22 for communicating with one or more premises devices 14 and one or more servers 20. In one or more embodiments, one or more transceiver 22 include one or more communication interfaces and/or are replace by one or more transmitters and/or receivers.

Controller 12 includes processing circuitry 24. In some embodiments, processing circuitry 24 may include a processor 26 and memory 28, memory 28 containing instructions which, when executed by processor 26, configure processor 26 to perform the one or more functions described herein such as the process described with respect to FIG. 3. In addition to a traditional processor and memory, control processing circuitry 24 may include integrated circuitry for processing and/or control, e.g., one or more processors and/or processor cores and/or FPGAs (Field Programmable Gate Array) and/or ASICs (Application Specific Integrated Circuitry).

Processing circuitry 24 may comprise and/or be connected to and/or be configured for accessing (e.g., writing to and/or reading from) memory 28, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by circuitry and/or other data, e.g., weather data, settings data, etc. Processing circuitry 24 may be configured to control any of the methods described herein and/or to cause such methods to be performed, e.g., by processor 26.

Corresponding instructions may be stored in memory 28, which may be readable and/or readably connected to the processing circuitry 24. In other words, processing circuitry 24 may include a controller, which may comprise a microprocessor and/or microcontroller and/or FPGA (Field-Programmable Gate Array) device and/or ASIC (Application Specific Integrated Circuit) device. It may be considered that processing circuitry 24 includes or may be connected or connectable to memory, which may be configured to be accessible for reading and/or writing by the controller and/or processing circuitry 24. Memory 28 is configured to store settings code 18 for performing the settings process described in detail with respect to FIG. 3.

Figure 3:
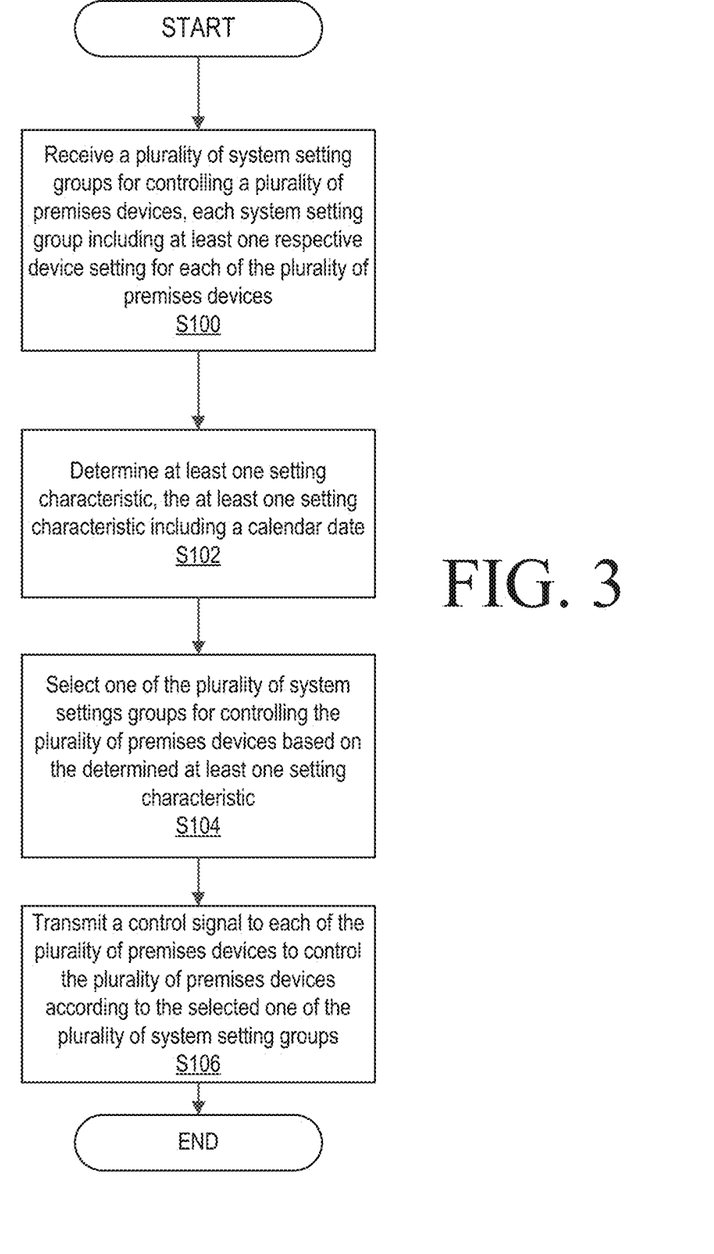
FIG. 3 is a flow diagram of an example setting process in accordance with the principles of the invention.

FIG. 3 is a block diagram of an exemplary setting process such as maybe performed by processor 26 when executing settings code 18 in accordance with the principles of the invention. Processing circuitry 24 is configured to receive a plurality of system setting groups for controlling a plurality of premises devices 14 where each system setting group may include at least one respective device setting for each of the plurality of premises devices 14 (Block S100). Processing circuitry 24 is configured to determine at least one setting characteristic where the at least one setting characteristic includes a calendar date (Block S102).

Processing circuitry 24 is configured to select one of the plurality of system settings groups for controlling the plurality of premises devices 14 based on the determined at least one setting characteristic (Block S104). Processing circuitry 24 such as via transceiver 22 is configured to transmit a control signal to each of the plurality of premises devices to control the plurality of premises devices according to the selected one of the plurality of system setting groups (Block S106).

According to one embodiment of this aspect, the determined at least one setting characteristic includes a geographical location of the controller 12, the selected one of the plurality of system setting groups being based on the determined geographical location of the controller 12. According to one embodiment of this aspect, a first system settings group of the plurality of system setting groups for controlling the plurality of premises devices 14 includes a first monthly temperature setting for at least one the plurality of premises devices 14, and a second system settings group of the plurality of system settings groups for controlling the plurality of premises devices 14 includes a second monthly temperature setting for at least one of the plurality of premises devices 14 where the second monthly temperature setting being different from the first monthly temperature setting.

According to one embodiment of this aspect, each of the plurality of system setting groups correspond to a respective seasonal setting. According to one embodiment of this aspect, the determined at least one setting characteristic includes a geographical location of the controller, a weather forecast associated with the determined geographical location and the calendar date during which a season is to begin, and the selected one of the plurality of system setting groups being based on the determined geographical location of the controller, the weather forecast associated with the determined geographical location and the calendar date during which the season is to begin.

According to one embodiment of this aspect, the selected one of the plurality of system setting groups includes at least one device setting for a heating and air condition (HVAC) system and at least one device setting for ceiling fan at the premises. According to one embodiment of this aspect, the selected one of the plurality of system setting groups includes at least one device setting for a heating and air condition (HVAC) system and at least one device setting for at least one home automation device. According to one embodiment of this aspect, the selected one of the plurality of system setting groups includes at least one device setting for an appliance at the premises and at least one device setting for at least one light fixture at the premises. According to one embodiment of this aspect, the processing circuitry is further configured to receive weather forecast data, the selected one of the plurality of system setting groups being based on the received weather forecast data.

In one or more embodiments, processing circuitry 24 is configured to receive a first group, i.e., group of system settings, of at least one device setting for controlling a premises device 14. In one or more embodiments, the first group of at least one device setting is received from a user via a user device and/or server 20. In one or more embodiments, the first group of at least one device setting includes various device settings for at least one premises device 14 in which each device setting corresponds to one or more setting characteristics.

For example, the first group of at least one device setting may include various device settings for a heating, ventilation and air conditioning (HVAC) premises devices 14 that are part of a HVAC system. The at least one device setting, e.g., operational settings, for the HVAC premises devices 14 may each correspond to one or more setting characteristics that are dynamically determined and/or received by controller 12 for selecting among the groups of at least one device setting as discussed herein. In one or more embodiments, the one or more setting characteristics includes a location of controller 12, one or more calendar dates, other weather data such as forecast information, data related to annual seasons, among other data that controller 12 may receive from server 20 for allowing controller 12 to dynamically select from among the groups of at least one device setting. In one example, the first group of the at least one device setting defines at least one temperature setting for the HVAC system for one or more months that is selected based on the at least one setting characteristic, e.g., defines one or more settings for of the HVAC system for the summer months based on the setting characteristic of a geographic location of controller 12.

Processing circuitry 24 is configured to receive a second group of at least one device setting for controlling premises device 14. In one or more embodiments, the second group of at least one device setting is received from a user via a user device and/or server 20. In one or more embodiments, the second group of at least one device setting includes various device settings for at least one premises device 14 in which each device setting corresponds to one or more setting characteristics.

For example, the second group of at least one device setting may include various device settings, e.g., operational settings, for a heating, ventilation and air conditioning (HVAC) premises devices 14 that are part of a HVAC system. The one or more device settings for the HVAC premises devices 14 may each correspond to one or more setting characteristics. In one or more embodiments, the one or more setting characteristics are used to select among the groups of at least one device settings, and include one or more of a location of controller 12, one or more calendar dates, other weather data such as forecast information, data related to annual seasons, among other data that controller 12 may receive from server 20 and/or determine. In one example, the second group of at least one device setting defines at least one temperature setting for the HVAC system for one or more months that is selected based at least one setting characteristic, e.g., defines one or more device settings for of the HVAC system for the winter months based on the setting characteristic of the geographically location of controller 12.

In one or more embodiments, the first group of at least one device setting is different from the second group of at least one device setting. For example, the first group of at least one device setting for controlling the premises device includes a first monthly temperature setting, and the second group of at least one device setting for controlling the premises device includes a second monthly temperature setting. In one or more embodiments, the first group of at least one device setting for controlling premises device 14 includes a first seasonal setting and the second group of at least one device setting for controlling premises device 14 includes a second seasonal setting different from the first seasonal setting. In one or more embodiments, the seasonal setting includes at least one device setting that is implemented for a predefined time, e.g., months. In one or more embodiments, the seasonal setting includes at least one setting that is implemented for a period of time, e.g., months, that is determined based on at least one setting characteristics determined from received weather data. In one or more embodiments, at least one of the group of at least one device setting for controlling premises device 14 and the second group of at least one device setting for controlling premises device 14, is received from a user via one or more inputs of controller 12 and/or via one or more servers 20. In one or more embodiments, the device settings are stored in memory 28. In one or more embodiments, each group of at least one device setting corresponds to a respective user scene in which each user scene is a predefined configuration for controlling premises device 14. Each user scene may be triggered for controlling premises device 14 if one or more setting characteristics are met.

In one or more embodiments, processing circuitry 24 is configured to determine at least setting characteristic. For example, in one or more embodiments, the at least setting characteristic is a geographical location of controller 12. The geographical location of the controller 12 may be determined based on location data received from server 20, thereby allowing controller 12 to dynamically select from among groups of at least one device setting for controlling premises device 14. For example, using geographic location of controller 12 allows controller 12 to select from among different groups of at least one device setting for a HVAC system where the temperature in Massachusetts is significantly different from temperature in South Florida. Therefore, respective groups of at least one device setting may be selected by respective controllers 12 located at different geographic locations.

In one or more embodiments, the at least one setting characteristic is a calendar date that may be determined based on data, e.g., weather data, received from one or more server 20, thereby allowing controller 12 to dynamically select from among groups of at least one device setting for controlling at least one premises device 14. For example, by taking into consideration a calendar date such when the determination of the calendar date is made by controller 12, controller 12 is able to select from among different groups of at least one setting for a HVAC system where the outside temperature may vary based on calendar date. Further, in one or more embodiments, the selected group of at least one device setting for a HVAC system includes at least one device setting for at least one other premises device 14 or other type of premises device 14. Therefore, respective groups of at least setting should be selected by controller 12 based on calendar date.

Other setting characteristics may be determined based on data received from one or more servers 20 and/or received from one or more devices in communication with controller 12. In one or more embodiments, processing circuitry 24 selects between the first group of at least one device setting for controlling premises device 14 and the second group of at least one device setting for controlling premises device 14, based on the determined at least one setting characteristic. For example, in one or more embodiments, the selection between the first group of at least one device setting for controlling premises device 14 and the second group of at least one device setting for controlling premises devices 14, is based on the calendar date. In one or more embodiments, the selection between the first group of at least one device setting for controlling premises device 14 and the second group of at least one device setting for controlling premises device 14, being based the determined at least one month during which at least one season is to begin.

In one or more embodiments, processing circuitry 24 is configured to cause transceiver 22 to transmit a control signal to control premises device 14 using the selected plurality of device settings. Control signal includes one or more control signals that are transmitted to one or more premises devices 14 for controlling the one or more premises devices 14 according to the selected group of at least one device setting. For example, in one embodiment, processing circuitry 24 selects a group of at least one device setting corresponding to a predefined "winter" setting based on a at least one setting characteristic such as a determined calendar date in which a control signal is transmitted to premises device 14, e.g., HVAC device, for controlling the premises device according to the predefined winter setting. Other settings for controlling premises device 14 are discussed herein.

Figure 4:
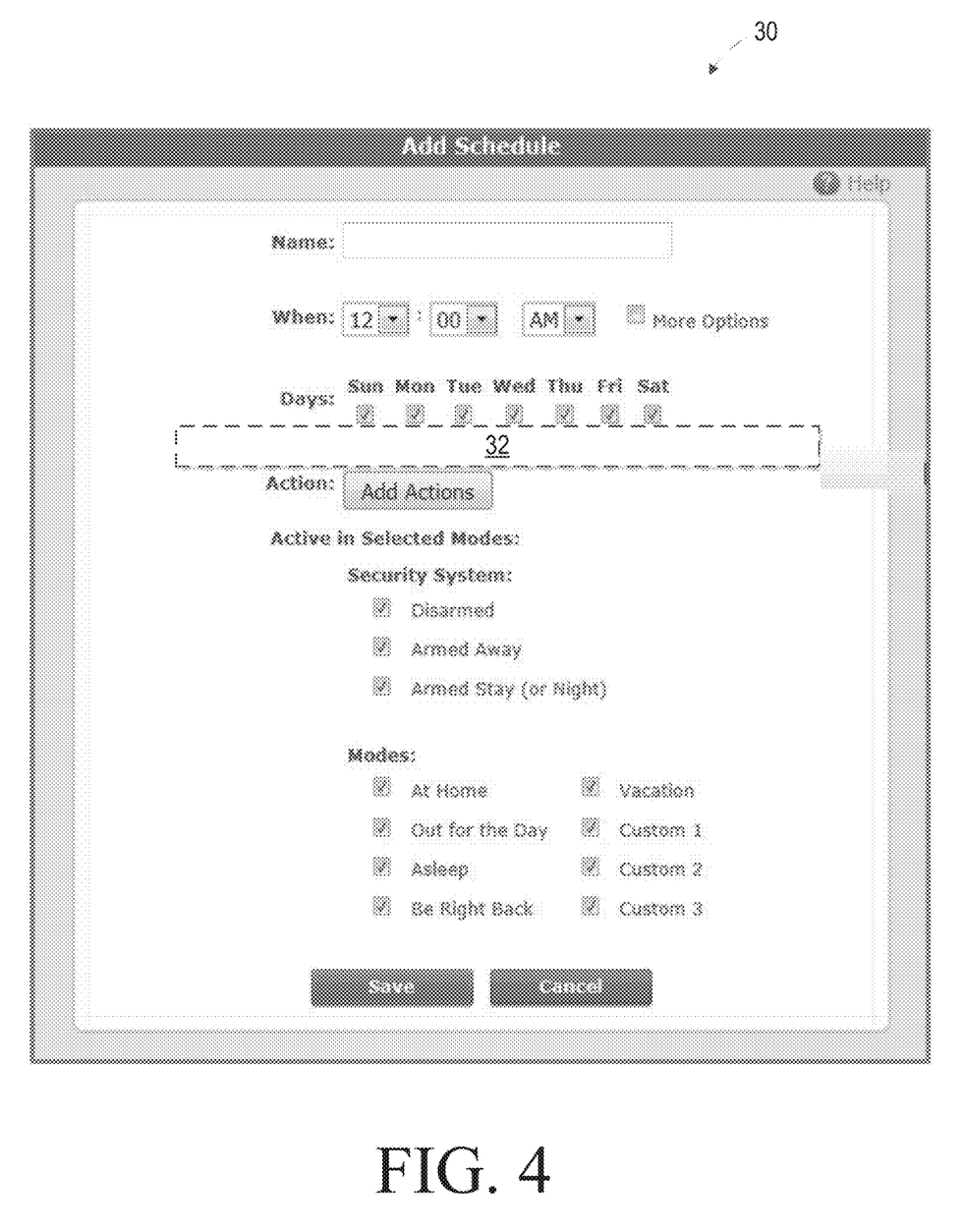
FIG. 4 is a block diagram of an example interface for input the settings for controlling premises device in accordance with the principles of the invention.

FIG. 4 is a block diagram of an exemplary interface 30 for inputting the device settings for controlling premises device 14 in accordance with the principles of the invention. In one or more embodiments, interface 30 is a software application operating on a user device or other device capable of operating/executing the software application. Interface 30 includes various configurable settings such as days, times, modes, etc. Further, interface 30 includes section 32 that is configured to allow a user to input one or more groups of at least one device setting for selection based on one or more setting characteristics as described herein. For example, in one or more embodiments, section 32 of interface 30 allows a user to input the first group of at least one device setting for controlling the premises device 14 and input the second group of at least one device setting for controlling the premises device 14. In one or more embodiments, section 32 allows a user to indicate one or more seasons and/or months, i.e., one or more groups of at least one device setting, for triggering the one or more device settings, i.e., user scenes.

Controller 12 advantageously provides for dynamic selection from among groups of at least one device setting based on one or more setting characteristics. Therefore, controller 12 advantageously takes into consideration one or setting characteristics associated with controller 12 for dynamically selecting among groups of at least one device setting without the need for a user to manually adjust premise devices 14.

Figure 5:
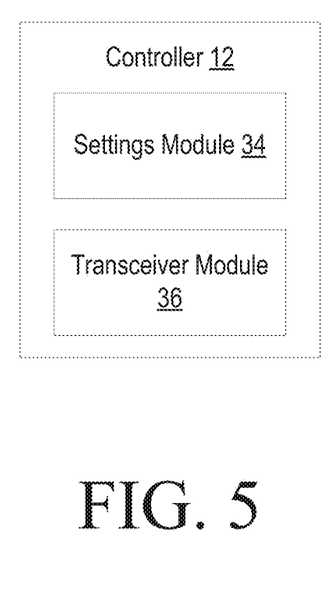
FIG. 5 is a block diagram of an alternative embodiment of controller in accordance with the principles of the invention.

FIG. 5 is a block diagram of an alternative embodiment of controller 12 in accordance with the principles of the invention. Controller 12 includes settings module 34 that is configured to perform the settings process as described above with respect to settings code 18. Controller 12 includes transceiver module 36 that is configured to transmit a control signal to control premises device 14 using the selected plurality of settings, as discussed above with respect to Block S108.

While the invention has been generally described with respect to an HVAC system, the teachings of the disclosure are equally applicable to other systems and/or devices are that controllable using one or more system/device settings.

As will be appreciated by one of skill in the art, the concepts described herein may be embodied as a method, system and controller. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a non-transitory tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A controller for a premises system, the controller comprising:
    processing circuitry configured to:
        receive a plurality of system setting groups for controlling a plurality of premises devices, each of the system setting groups including a physical access control settings group, at least one of the plurality of premises devices being configured to control physical access to a premises based on the physical access control settings group, each system setting group including at least one respective device setting for each of the plurality of premises devices and a mode of operation;
        receive weather forecast data;
        determine at least one setting characteristic, the at least one setting characteristic including a calendar date;
        select one of the plurality of system settings groups for controlling the plurality of premises devices based on the received weather forecast data and the determined at least one setting characteristic; and
    a transceiver configured to transmit a control signal to each of the plurality of premises devices to control the plurality of premises devices according to the selected one of the plurality of system setting groups.

2. The controller of claim 1, wherein the determined at least one setting characteristic includes a geographical location of the controller, the selected one of the plurality of system setting groups being based on the determined geographical location of the controller.

3. The controller of claim 1, wherein a first system settings group of the plurality of system setting groups for controlling the plurality of premises devices includes a first monthly temperature setting for at least one the plurality of premises devices;
    a second system settings group of the plurality of system settings groups for controlling the plurality of premises devices includes a second monthly temperature setting for at least one of the plurality of premises devices, the second monthly temperature setting being different from the first monthly temperature setting; and
    a third system setting group of the plurality of system settings groups for controlling the plurality of premises devices includes the mode of operation, the mode of operation being one of an at-home mode, an out-for-the day mode, an asleep mode, a vacation mode, and at least one customizable mode.

4. The controller of claim 1, wherein each of the plurality of system setting groups correspond to a respective seasonal setting.

5. The controller of claim 1, wherein the determined at least one setting characteristic includes a geographical location of the controller, a weather forecast associated with the determined geographical location and the calendar date during which a season is to begin; and
    the selected one of the plurality of system setting groups being based on the determined geographical location of the controller, the weather forecast associated with the determined geographical location and the calendar date during which the season is to begin.

6. The controller of the claim 1, wherein the selected one of the plurality of system setting groups includes at least one device setting for a heating and air condition (HVAC) system and at least one device setting for ceiling fan at a premises.

7. The controller of the claim 1, wherein the selected one of the plurality of system setting groups includes at least one device setting for a heating and air condition (HVAC) system and at least one device setting for at least one home automation device.

8. The controller of the claim 1, wherein the selected one of the plurality of system setting groups includes at least one device setting for an appliance at a premises and at least one device setting for at least one light fixture at the premises.

9. A method for a controller for a premises system, the method comprising:
    receiving a plurality of system setting groups for controlling a plurality of premises devices, each of the system setting groups including a physical access control settings group, at least one of the plurality of premises devices being configured to control physical access to a premises based on the physical access control settings group, each system setting group including at least one respective device setting for each of the plurality of premises devices and a mode of operation;

receiving weather forecast data;

determining at least one setting characteristic, the at least one setting characteristic including a calendar date;

selecting one of the plurality of system settings groups for controlling the plurality of premises devices based on the received weather forecast data and the determined at least one setting characteristic; and transmitting a control signal to each of the plurality of premises devices to control the plurality of premises devices according to the selected one of the plurality of system setting groups.

10. The method of claim 9, wherein the determined at least one setting characteristic includes a geographical location of the controller, the selected one of the plurality of system setting groups being based on the determined geographical location of the controller.

11. The method of claim 9, wherein a first system settings group of the plurality of system setting groups for controlling the plurality of premises devices includes a first monthly temperature setting for at least one the plurality of premises devices;

a second system settings group of the plurality of system settings groups for controlling the plurality of premises devices includes a second monthly temperature setting for at least one of the plurality of premises devices, the second monthly temperature setting being different from the first monthly temperature setting; and a third system setting group of the plurality of system settings groups for controlling the plurality of premises devices includes the mode of operation, the mode of operation being one of an at-home mode, an out-for-the day mode, an asleep mode, a vacation mode, and at least one customizable mode.

12. The method of claim 9, wherein each of the plurality of system setting groups correspond to a respective seasonal setting.

13. The method of claim 9, wherein the determined at least one setting characteristic includes a geographical location of the controller, a weather forecast associated with the determined geographical location and the calendar date during which a season is to begin; and the selected one of the plurality of system setting groups being based on the determined geographical location of the controller, the weather forecast associated with the determined geographical location and the calendar date during which the season is to begin.

14. The method of the claim 9, wherein the selected one of the plurality of system setting groups includes at least one device setting for a heating and air condition (HVAC) system and at least one device setting for ceiling fan at a premises.

15. The method of the claim 9, wherein the selected one of the plurality of system setting groups includes at least one device setting for a heating and air condition (HVAC) system and at least one device setting for at least one home automation device.

16. The method of the claim 9, wherein the selected one of the plurality of system setting groups includes at least one device setting for an appliance at a premises and at least one device setting for at least one light fixture at the premises.

17. A controller for a premises system, the controller comprising:

processing circuitry configured to:
receive a plurality of system setting groups for controlling a plurality of different types of premises devices, each of the system setting groups including a physical access control settings group, at least one of the plurality of premises devices being configured to control physical access to a premises based on the physical access control settings group, each system setting group corresponding to a respective seasonal setting and including at least one respective device setting for each of the plurality of different types of premises devices and a mode of operation;

receive weather forecast data;

determine at least one setting characteristic, the at least one setting characteristic including a calendar date and geographical location of the controller;

select one of the plurality of system settings groups for controlling the plurality of different types of premises devices based on the received weather forecast data and the determined at least one setting characteristic; and a transceiver configured to transmit a control signal to each of the plurality of different types of premises devices to control the plurality of different types of premises devices according to the selected one of the plurality of system setting groups.

18. The controller of claim 17, wherein the mode of operation is one of an at-home mode, an out-for-the day mode, an asleep mode, a vacation mode, and at least one customizable mode.

* * * * *